May 20, 1941.  L. F. ATWOOD  2,242,336
POWER SAW
Filed Sept. 2, 1938  3 Sheets-Sheet 1
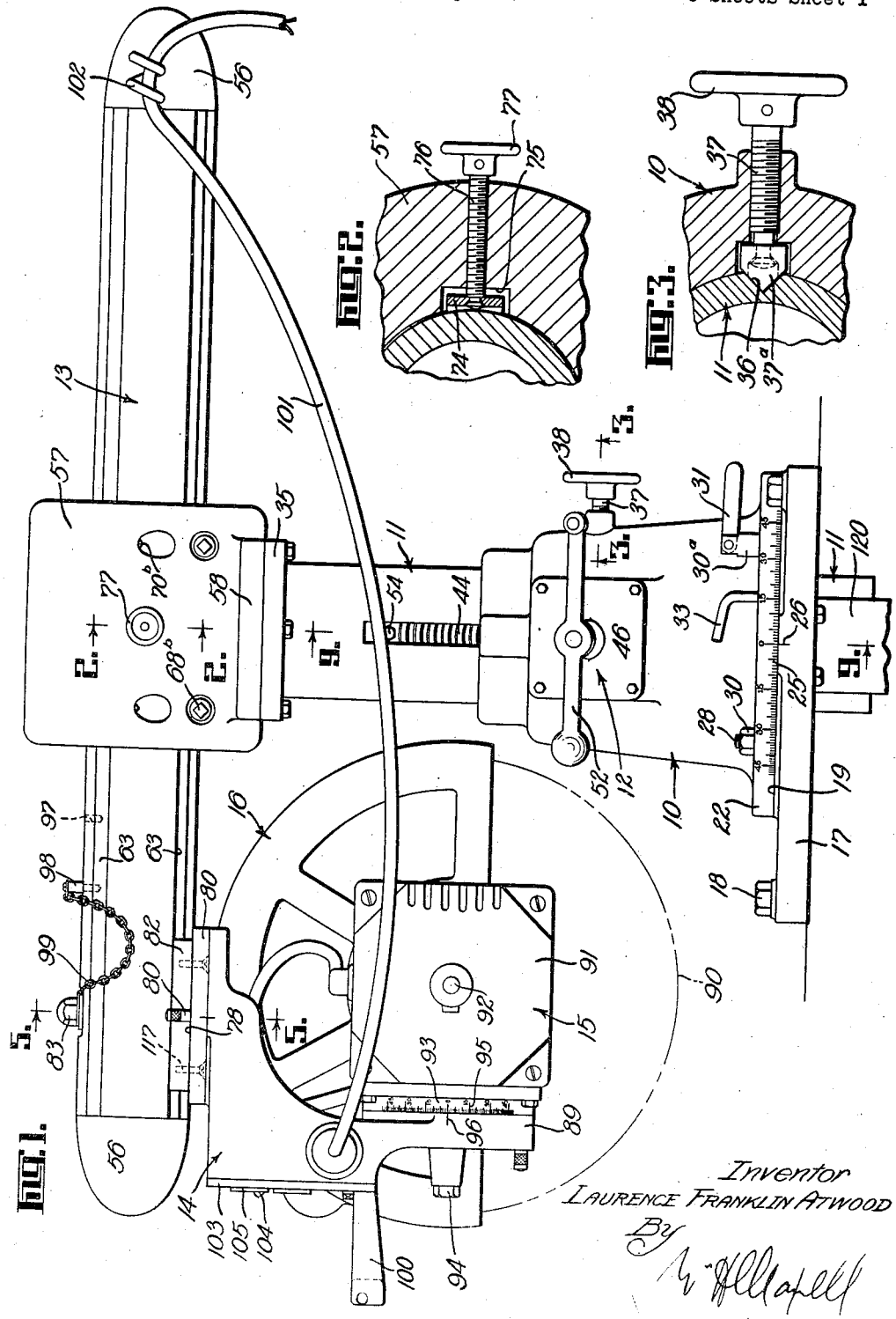
Inventor
LAURENCE FRANKLIN ATWOOD
By
His Attorney May 20, 1941.　　　L. F. ATWOOD　　　2,242,336
POWER SAW
Filed Sept. 2, 1938　　3 Sheets-Sheet 2
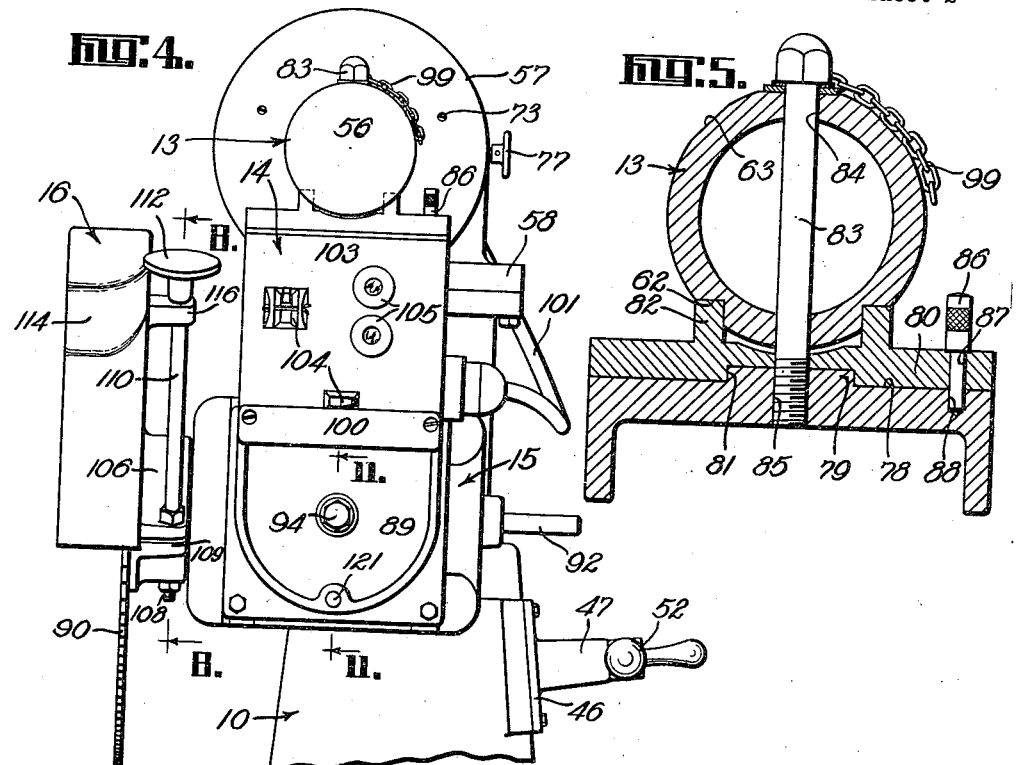
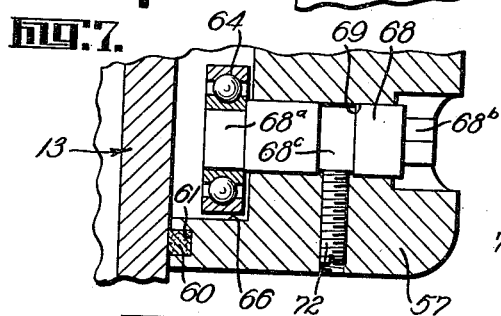
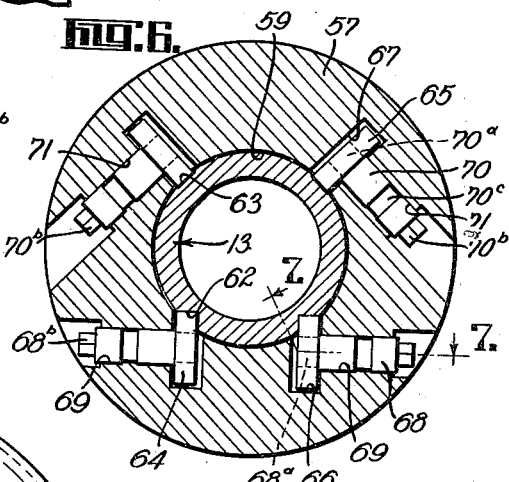
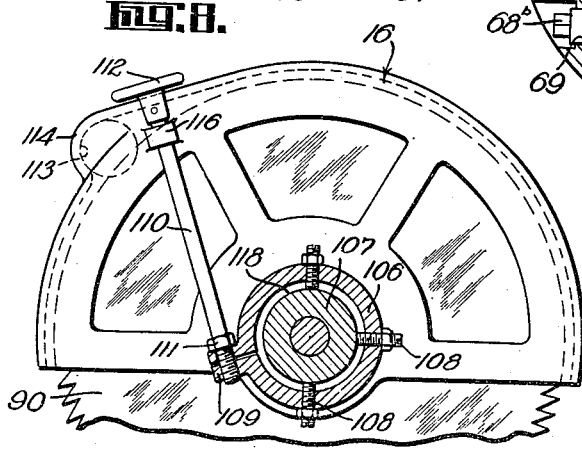
Inventor
LAURENCE FRANKLIN ATWOOD
By
His Attorney May 20, 1941.   L. F. ATWOOD   2,242,336
POWER SAW
Filed Sept. 2, 1938   3 Sheets-Sheet 3
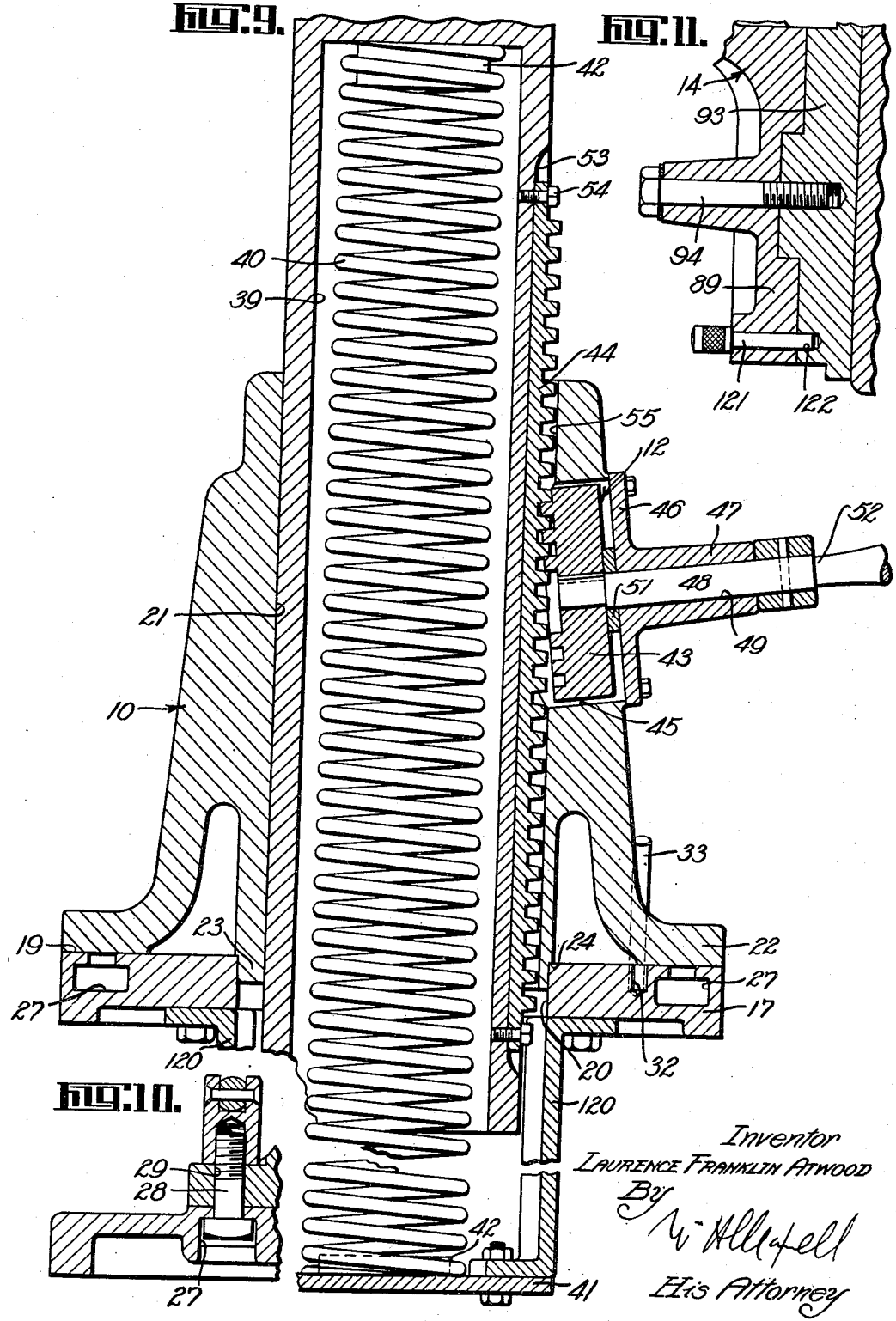

Patented May 20, 1941

2,242,336

UNITED STATES PATENT OFFICE 2,242,336

POWER SAW

Laurence Franklin Atwood, Los Angeles County, Calif., assignor to Consolidated Machinery & Supply Co., Ltd., Los Angeles, Calif., a corporation of California Application September 2, 1938, Serial No. 228,163

2 Claims. (Cl. 143—47)

This invention relates to power saws and relates more particularly to portable power wood working saws. A general object of this invention is to provide a practical, inexpensive and highly efficient portable power saw.

The present invention relates to a portable power tool or machine of the class employed in the performance of various wood working operations such as cross cutting, ripping, mitering, dadoing, etc. I will herein refer to the machine of the present invention as a saw or power saw, it being understood that these terms are not to be construed as limiting the scope or application of the invention.

Another object of this invention is to provide a power saw of the character mentioned that may be easily and quickly adjusted to perform numerous wood working operations with great accuracy.

Another object of this invention is to provide a saw of the character mentioned that is compact and light in weight to be transported and installed with ease and that is strong and powerful to efficiently and accurately perform heavy duty work as well as light work.

Another object of this invention is to provide a portable power saw of the character mentioned that is such that the saw proper may be adjusted and manipulated in such a manner that it is unnecessary to align or move the work supporting table.

Another object of this invention is to provide a saw of the character mentioned in which the calibrated adjustable swivel mountings and connections are of large radii permitting very accurate adjustments to be made with ease and facility.

Another object of this invention is to provide a power saw of the character mentioned embodying a traveling or shiftable saw carrying arm supported by fully enclosed and readily adjustable bearings that assure smooth even movement of the arm at all times.

Another object of this invention is to provide a saw of the character mentioned in which the tool operating motor is mounted on the traveling arm in a novel manner to provide for a maximum range of adjustment of the saw blade without the necessity of increasing the length of the arm and without employing an excessively wide work supporting table.

A further object of this invention is to provide a power saw of the character referred to embodying a novel and practical safety guard for the saw blade.

The various objects and features of my invention will be fully understood from the following detailed description of a typical preferred form and application of my invention, throughout which description reference is made to the accompanying drawings, in which:

Fig. 1 is a side elevation of the improved saw of the present invention. Fig. 2 is an enlarged fragmentary vertical detailed sectional view taken as indicated by line 2—2 on Fig. 1. Fig. 3 is an enlarged fragmentary horizontal detailed sectional view taken as indicated by line 3—3 on Fig. 1. Fig. 4 is a fragmentary end elevation of the saw. Fig. 5 is an enlarged vertical detailed sectional view taken as indicated by line 5—5 on Fig. 1. Fig. 6 is an enlarged vertical detailed sectional view of the column head illustrating the bearings for the traveling arm. Fig. 7 is an enlarged fragmentary detailed sectional view taken as indicated by line 7—7 on Fig. 6. Fig. 8 is a fragmentary vertical detailed sectional view taken as indicated by line 8—8 on Fig. 4. Fig. 9 is an enlarged fragmentary vertical detailed sectional view taken as indicated by line 9—9 on Fig. 1. Fig. 10 is a fragmentary vertical sectional view illustrating the connection between the base and the mounting plate, and Fig. 11 is an enlarged fragmentary vertical detailed sectional view taken as indicated by line 11—11 on Fig. 4.

The improved portable power saw of the present invention may be said to comprise, generally, a turnable base 10, a column 11 shiftable vertically in the base 10, means 12 for adjusting the column 11 vertically, a horizontal arm 13 shiftably carried on the column 11, a bracket 14 pivotally adjustable on the arm 13, a saw operating motor 15 adjustable on the bracket 14 and a saw guard 16 associated with the motor 15.

The base 10 is provided to carry and guide the vertical column 11. In accordance with the invention the base 10 is adapted to be turnably supported on a bench, table or other suitable supporting structure. A mounting base plate 17 is provided to carry the base 10 and to facilitate its connection with the table or bench. The plate 17 may be secured to its support by bolts or screws 18. The plate 17 has a flat horizontal upper surface 19 that is finished or machined and a central vertical opening 20 is provided in the plate. The base 10 is a vertically disposed member and is tubular, having a central vertical opening 21 for receiving the column 11. A circular outwardly projecting flange 22 is provided on the lower end of the base 10 and the external surface of the base may slope or taper upwardly and inwardly from its base 22. The under surface of the flange 22 is machined to turnably bear on the surface 19 of the plate 17. A central skirt 23 projects downwardly from the base 10 and enters the opening 20 of the plate 17. The skirt 23 may have a downwardly facing shoulder 24 bearing on the surface 19 of the plate 17. The skirt 23 cooperating with the wall of the opening 20 assists in maintaining the base 10 centralized and in a vertical position. The periphery of the base flange 10 is provided with a series of calibrations 25 and a suitably located mark 26 is provided on the plate 17. The calibrations 25 are preferably numbered to indicate the angular or rotative position of the base 10 and the calibrations are adapted to align with the mark 26 on the stationary plate 17 to indicate the several angular adjustments of the base 10.

The invention includes means for setting and locking the base 10 in the selected rotative or angular positions. An annular concentric groove 27 is provided in the stationary base plate 17. The groove 27 is of inverted T-shape in vertical cross section and is open at or extends to the surface 19 of the plate 17. Screws 28 cooperate with the groove 27 and extend upwardly through the openings 29 in the flange 22. The screws 28 are preferably arranged to have their heads in the enlarged lower portions of the T groove 27 and suitable openings may be provided in the under side of the plate 17 to admit the screws to the groove. Nuts 30 are threaded on the projecting upper portions of the screws 28 and are adapted to clamp against the upper side of the flange 22 to secure the base 10 in position on the plate 17. One nut 30ª is preferably provided with a pivoted handle 31 to be more readily manipulated. The nut 30ª may be employed to clamp or lock the base 10 in the selected rotative position and the nuts 30 may be left partially loose to permit turning or adjustment of the base when the nut 30ª is freed or loosened. A plurality of circumferentially spaced sockets 32 is provided in the base plate 17 and a stop pin 33 is passed through an opening in the flange 22 and is adapted to enter any one of the sockets 32 to positively stop or locate the base 10 at positions 90° and 45° in both directions from a central position. The base 10 has an adjustment of 360° on the plate 17. It is to be observed that the flange 22 of the base 10 is of large diameter to assure a steady firm support for the base and it is to be noted that the calibrations 25 are provided on this large diametered flange 22 to permit the easy accurate adjustment of the base 10.

The column 11 is provided to carry the horizontal traveling arm 13. The column 11 is a shiftable vertically disposed member extending upwardly from the base 10. In practice the column 11 is an elongated cylindrical member slidably received in the opening 21 of the base 10. It is preferred to machine the column 11 to accurately slidably fit the opening 21. The column 11 is of substantial length to have a wide range of vertical adjustment with respect to the base 10. A radially or outwardly projecting flange 35 is provided on the upper end of the column 11. Means is provided for holding the column 11 against turning in the base 10. A longitudinal groove 36 of V-shaped cross section is provided in the column 11 and a screw 37 is threaded through a transverse opening in the wall of the base 10 and has a beveled shoe 37ª to conform to and cooperate with the groove 36. The shoe 37ª has a suitable rotatable or swivel connection with the screw 37. The engagement of the shoe 37ª in the groove 36 serves to prevent turning of the column 11 and to maintain the column in a true or definite rotative position with respect to the base 10. A hand wheel 38 is secured to the projecting outer end of the screw 37 and the screw may be tightened down to positively lock the column 11 in any selected vertical adjustment or position.

It is preferred to provide means for counterbalancing or partially counterbalancing the weight of the column 11 and the parts carried thereby to facilitate the vertical adjustment of the column by the means 12. A longitudinal socket 39 of substantial length enters the column 11 from its lower end. A strong helical spring 40 extends longitudinally through the socket 39 and has its upper end engaging the upper wall of the socket. A plate 41 is secured to the plate 17 by hangers 120 and the lower end of the spring 40 bears on the plate 41. Centering bosses 42 may enter the opposite ends of the spring 40 to hold the spring centralized. The spring 40 is under compression between the end wall of the socket 39 and the plate 41 to assume the weight or a portion of the weight of the column 11 and the parts carried thereby. The structure just described is such that the column 11 may be adjusted to project below the base 10.

The means 12 for adjusting the column 11 is such that the column may be easily and quickly shifted vertically to bring the arm 13 and the saw blade 90 to the selected position. The column adjusting means 12 is in the nature of a gear mechanism including a scroll gear 43 in the base 10 and a rack 44 on the column 11 engaged by the gear. The gear 43 is housed in an opening 45 in the wall of the base 10 and is provided on its inner surface with scroll teeth for cooperating with the teeth of the rack 44. A cover plate 46 closes the outer end of the opening 45 and has an outwardly projecting boss 47. A shaft 48 is keyed or fixed to the gear 43 and extends outwardly through an opening 49 in the plate 46 and its boss 47. A spacer 51 is arranged on the shaft between the outer face of the gear 43 and the cover plate 46. A suitable lever or handle 52 is secured to the projecting outer end of the shaft 48 to provide for the easy rotation of the gear 43. The gear 43 is disposed at an angle to the vertical to properly cooperate with the teeth of the rack 44 at one side of the axis of rotation of the gear.

The rack 44 is set in a groove 53 in the column 11 and may be secured to the column by cap screws 54. The heads of the screws 54 may be engageable by the gear 43 to limit the vertical travel of the column with respect to the base 10. The teeth of the rack 44 protrude from the surface of the column 11 for engagement by the teeth of the scroll gear 43. A groove 55 is provided in the wall of the opening 21 to receive or pass the teeth of the rack 44. The cooperation of the rack teeth with the groove 55 may assist in preventing turning of the column 11 in the base 10. Due to the weight compensating action of the above described spring 40 the scroll gear and the rack 44 may have a high gear ratio to effect a rapid vertical adjustment of the column 11. The operating handle 52 of the adjusting means 12 is conveniently accessible for the adjustment of the column 11.

The arm 13 is a horizontally arranged element supported on the upper end of the column 11 for horizontal or longitudinal movement. The arm 13 is an elongate member of considerable length. In the preferred construction the arm 13 is cylindrical and is preferably tubular to be light in weight. The arm 13 preferably has a substantial wall thickness and being tubular has sufficient strength to support the bracket 14, motor 15, etc. in any selected position without distortion or flexing. The opposite ends of the arm 13 are provided with ellipsoidal heads or caps 56.

The invention provides novel and particularly effective means for supporting the horizontal arm 13 on the upper end of the column 11. This means includes a barrel or head 57 on the upper end of the column 11. The lower side of the head 57 is provided with a flange 58 which is suitably secured to the flange 35 as by bolts. A horizontal opening 59 extends through the head 57 from one end to the other and receives or passes the arm 13 with some clearance. Means are provided for preventing the entrance of sawdust and foreign matter to the opposite ends of the arm passing opening 59. Lubricant retaining rings 60 of felt, or the like, are set in annular grooves 61 in the wall of the opening 59 to closely engage about and wipe the traveling arm 13. The rings 60 are preferably located adjacent the opposite ends of the head 57 and serve to prevent the entrance of foreign matter into the opening 59. The head 57 is constructed and mounted so that the longitudinal axis of its opening 59 is horizontally offset from the longitudinal axis of the column 11. This is best illustrated in Fig. 4 of the drawings.

The invention includes particularly effective bearing means enclosed in the sealed head 57 to support the traveling arm 13 for free longitudinal movement. Two spaced longitudinally extending flat walled grooves 62 are provided in the lower surface portion of the arm 13 and two spaced longitudinally extending flat surfaces 63 are provided on the upper portion of the arm. Bearings 64 are provided to cooperate with the grooves 62 and similar bearings 65 are provided to cooperate with the flat surfaces 63. The bearings 64 are housed in pockets 66 in the interior of the tubular head 57 and the bearings 65 are housed in similar pockets 67 in the head. The bearings 64 and 65 are arranged in sets adjacent the ends of the head 57. The bearings 64 and 65 are preferably anti-friction bearings and may be in the nature of ball bearings as illustrated. Pins or shafts 68 are turnably arranged in openings 69 in the head 57 and have eccentric inner end portions 68a carrying the bearings 64. The bearings 65 are carried by the eccentric portions 70a of similar pins 70 turnable in openings 71 in the head 57. The inner parts or races of the bearings 64 and 65 are fixed to their respective shaft portions 68a and 70a. The shafts 68 have polygonal outer end portions 68b accessible at the outer ends of the openings 69 and the shafts 70 have similar polygonal portions 70b accessible from the outer ends of the openings 71. The shafts 68 and 70 are adapted to be turned by means of their polygonal portions 68b and 70b to effect the adjustment of the bearings 64 and 65. It will be understood how turning of a shaft 68 or 70 may bring its bearing 64 or 65 into tighter or closer engagement with the groove 62 or the surface 63 of the arm 13.

Means are provided for setting or locking the bearing shafts 68 and 70 in the adjusted positions. The shafts 68 have annular grooves 68c and set screws 72 are threaded through openings in the head 57 to engage in the grooves and lock the shafts in the adjusted positions. The bearing shafts 70 have annular grooves 70c and set screws 73 are threaded through openings in the ends of the head 57 to engage in the grooves 70c and lock the bearing shafts 70 in the adjusted positions. The bearing means just described are such that the bearings 64 and 65 may be easily and conveniently adjusted from the exterior of the head 57 to assure the correct mounting of the traveling arm 13. The bearings 64 engaging in the grooves 62 and the bearings 65 engaging the surfaces 63 adjacent the opposite ends of the head 57 serve to dependably prevent turning of the arm 13 and rocking or tipping of the arm.

Means is provided to seat or lock the arm 13 in any selected position. This means includes a shoe 74 for cooperating with the arm 13. The shoe 74 is housed in a pocket 75 in the wall of the opening 59 and is shaped to have effective movement resisting cooperation with the arm. A screw 76 is threaded through an opening in the head 57 and its inner end is swivelly connected with the shoe 74. A handle or wheel 77 is secured to the outer end of the screw 76 to facilitate the actuation and release of the shoe 74. When the shoe 74 is clamped against the arm 13 by the screw 76 it serves to dependably hold the arm against longitudinal shifting. The shoe 74 may be easily released from the arm 13 by merely backing off the screw 76.

The bracket 14 is provided on the forward end portion of the traveling arm 13 to support the saw operating motor 15. The bracket 14 is a rigid member but is supported on the arm 13 for adjustment through 360° about a vertical axis to permit adjustment of the saw between the ripping and cutoff positions. The bracket 14 is of generally inverted L-shape having a substantially horizontal upper part and a major substantially vertical lower part. The upper part of the bracket 14 has an upwardly facing finished surface 78 provided with a central upstanding boss 79. A bearing plate or mounting plate 80 cooperates with the surface 78. The lower side of the plate 80 is finished to cooperate with the finished surface 78 and has a socket 81 turnably receiving the boss 79 to center and guide the bracket 14 for adjustment about a vertical axis. The plate 80 is secured to the arm 13 by screws 117. Spaced ribs 82 on the upper side of the plate 80 fit in the above described grooves 62. A bolt or screw 83 is passed down through an opening 84 in the arm 13 and extends through a central opening in the plate 80. The lower portion of the screw 83 is threaded in an opening 85 in the bracket 14 and the head of the screw 83 is accessible at the upper side of the arm 13. When the screw 83 is tightened the surface 78 of the bracket 14 is tightly clamped against the plate 80 and the bracket is securely held in the selected position. Suitable marks on the bracket 14 and the plate 80 are adapted to be aligned to indicate the cutoff and ripping positions of the bracket. A pin 86 is removably received in an opening 87 in the plate 80 and is adapted to be received in spaced openings 88 in the bracket 14 to lock the bracket 14 in predetermined positions, for example, in the ripping and cutoff positions. The vertical arm or lower portion of the L-shaped bracket 14 is provided adjacent its lower end with a rearwardly facing flange 89. The flange 89 is of substantial diameter and has a finished or machined rear surface.

The flange 88 is provided to carry the motor 15.

The motor 15 is the saw driving or operating element of the machine. In the drawings I have illustrated the motor 15 as operating a circular saw 90, it being understood that cutting devices or tools of various natures may be operated by the motor 15. The motor 15 is a suitable electric motor and is preferably of a type that may be operated by the current of different voltages. In the drawings I have shown the motor 15 as embodying a substantially rectangular housing 91, it being obvious that the motor may be of any selected construction. The motor 15 is positioned below the arm 13 and at the rear of the bracket 14. When the bracket 14 is in the cutoff position illustrated in the drawings the shaft 92 of the motor 15 is substantially horizontal and extends transversely with respect to the longitudinal axis of the arm 13.

In accordance with the invention the motor 15 is pivotally or adjustably connected with the bracket 14 so that it may be moved throughout 360° to positions to provide for mitering, compound mitering, and similar operations. The motor housing 91 is provided with a front plate 93 machined or finished to bear against the rear surface of the flange 89. A clamp bolt 94 serves to connect the motor 15 to the bracket 14. The bolt 94 projects forwardly from the front face of the bracket 14 for convenient engagement. When the bolt 94 is loosened the motor 15 may be adjusted or turned to various positions. The plate 93 is provided on its periphery with calibrations 95 adapted to be aligned with a mark 96 on the flange 89 to provide for the accurate setting of the motor 15 in various angular positions. A pin 121 is carried in an opening in the flange 89 and is adapted to be entered in spaced sockets 122 in the plate 93 to set the motor in given angular positions.

It is preferred to provide means for limiting rearward travel of the arm 13 when the motor 15 is adjusted to positions for compound mitering and similar operations to prevent the blade or saw from striking the column 11. In the drawings I have shown spaced sockets 97 in the upper forward portion of the arm 13 and a pin 98 adapted to be seated in any one of the openings 97 to limit the rearward travel of the arm 13. The pin 98 is adapted to engage the forward end of the head 57 to limit the rearward movement of the arm 13. A chain 99 may connect the pin 98 with the screw 83 to prevent the loss of the pin. A suitable handle 100 may project forwardly from the bracket 14 to facilitate the easy manipulation or shifting of the arm, bracket and motor assembly.

Electrical current may be supplied to the motor 15 by a flexible electrical conductor 101. The conductor 101 may extend forwardly to the bracket 14 from a suitable loose attaching means 102 on the rear end 56 of the arm 13. A control panel or switch plate 103 is provided on the front of the bracket 14 and carries switches 104 for governing the motor 15 and fuses 105 for the motor circuit. The switches 104 are readily accessible for manipulation at the front of the motor bracket 14.

The guard 16 is in the nature of a safety shield for the upper portion of the blade or saw 90. The guard 16 is partially circular or disc-shaped in side elevation and is provided adjacent its straight lower edge with a tubular hub 106. The hub 106 freely receives a bearing housing or boss 107 on an end of the motor housing 91. Set screws 108 may be provided on the hub 106 to engage in an annular groove 115 in the boss 107 and center or locate the guard 16 with respect to the saw 90 and to prevent endwise movement of the guard 16. The guard hub 106 is split at one side and lugs 109 project radially at each side of the split. A screw 110 is threaded in an opening in one lug 109 and has a nut 111 engaging against the other lug 109. The screw 110 extends outwardly to the periphery of the guard 16 and has a suitable operating wheel or handle 112 on its outer end. The screw 110 passes through an opening in a lug 116 adjacent the periphery of the guard 16 to be stabilized thereby. When the screw 110 is tightened the hub 106 and set screws 108 tightly grip the boss 107 to secure the guard 16 in the selected position. When the screw 110 is loosened the guard 16 may be turned or adjusted as found necessary. The opposite sides of the guard 16 may be perforate or webbed while the periphery of the guard is preferably closed. A lateral outlet 113 is provided in a projection 114 on the periphery of the guard 16 to discharge the cuttings or sawdust from the guard when ripping.

It is believed that the utility of the portable power saw of the present invention will be readily understood from the foregoing detailed description. In installing and employing the machine of the present invention the plate 17 may be secured to a suitable support such as a table or bench. If necessary or desired the base 10 may be adjusted or turned by merely loosening the nut 30ª, withdrawing the pin 33 and then bodily turning the base on the plate 17. The extent or angle of turning of the base 10 is indicated by the calibrations 25 read with the mark 26 and the base may be locked in the selected position by tightening down the nut 30ª. The column 11 may be easily and conveniently adjusted vertically to bring the saw 90 to the selected elevation to make cuts of the desired depth, etc. The screw 37 may be backed off and the handle 52 operated so that the scroll gear 43 cooperates with the rack 44 to move the column 11 vertically. If desired or necessary the screw 37 may be tightened down following the vertical adjustment of the column 11. For cutoff work the bracket 14 and the motor 15 may be positioned as illustrated in the drawings and the handle 100 may be grasped to effect the necessary movement of the arm 13, motor 15 and saw 90 to carry on the cutting off operations. When it is desired to employ the machine for ripping the screw 83 may be loosened and the bracket 14 turned or adjusted to a position where the saw 90 is disposed longitudinally of the work. If desired or necessary the shoe 74 may be tightened down by means of the screw 76 to set the arm 13 in a given position when the work is fed to the saw for ripping. For mitering and compound mitering work the bolt 94 is loosened and the motor 15 is turned to bring the saw 90 to the selected angle.

The rotary or pivotal adjustment of the base 10 on the plate 17, the axial adjustment of the arm 13 on the column 11, the vertical adjustment of the column, the pivotal adjustment of the bracket 14 on the arm 13 and the pivotal adjustment of the motor 15 on the bracket 14 provide for or permit the use of the machine for a great number of wood working operations. The motor 15 is supported in substantially vertical alignment with the vertical axis of the connection between the bracket 14 and the arm 13 in a manner to impose a minimum of strain on the bracket 14, and the several connections when in position for any cutting operations. The relationship between the motor 15 and the pivotal connection of the bracket 14 and the arm 13 assures ease in adjusting the motor and bracket between the rip and cutoff positions and allows the arm to be moved rearwardly a maximum distance. The several adjusting means are conveniently accessible and provide for wide ranges of adjustment. It is to be observed that the flange 22 and the flange 89 are of large diameter to carry large calibrations and to provide for accurate adjustments. The arm 13 supported by the anti-friction bearings in the head 57 is very easy to shift or move longitudinally. The bearings 64 and 65 are completely enclosed within the head 57 and the opposite ends of the head are sealed by the rings 60 so that sawdust and the like cannot foul the bearings. The bearings 64 and 65 may be easily and conveniently adjusted from time to time, as necessary, by merely loosening the set screws 72 and 73 and turning the shafts 68 and 70. The improved machine or saw of the invention is compact and light in weight and yet is strong, durable and capable of performing heavy work.

Having described only a typical preferred form and application of my invention I do not wish to be limited or restricted to the specific form and application herein set forth, but wish to reserve to myself any variations or modifications that may appear to those skilled in the art or fall within the scope of the following claims.

Having described my invention, I claim:

1. In a woodworking saw having a traveling arm, the combination of, a bracket secured to the arm to depend therefrom, a tool operating motor secured to the rear side of the bracket, handle means on the front of the bracket for operating the arm, and switch means on the bracket for controlling the motor and including an operating part accessible at the front of the bracket.

2. In a woodworking saw having a traveling arm, the combination of, a bracket secured to the arm to depend therefrom, a tool operating motor secured to the rear side of the bracket, a handle projecting from the front of the bracket, switch means carried by the bracket for controlling the motor, and an operating part for the switch means located at the front of the bracket to be accessible by the operator's hand grasping the handle.

LAURENCE FRANKLIN ATWOOD.